United States Patent Office 3,453,215
Patented July 1, 1969

3,453,215
HOT PRESSED POLYCRYSTALLINE LASER MATERIAL
Edward Carnall, Jr., Sherley E. Hatch, William F. Parsons, and Robert J. Weagley, Rochester, N.Y., assignors to Eastman Kodak Company, Rochester, N.Y., a corporation of New Jersey
Continuation of application Ser. No. 376,715, June 22, 1964. This application Mar. 6, 1967, Ser. No. 621,071
Int. Cl. G21c *19/42*
U.S. Cl. 252—301.1                      6 Claims

ABSTRACT OF THE DISCLOSURE

This invention relates to a polycrystalline laser material, produced by hot pressing a purified mixture of powders including a host compound such as powdered calcium, strontium or barium fluoride and a doping ion compound powder containing ions such as $Sm^{2+}$, $Dy^{2+}$, $Ho^{3+}$, $U^{3+}$, $Yb^{3+}$, $Nd^{3+}$, $Tm^{2+}$ and $Tm^{3+}$.

---

This application is a continuation of our earlier copending application Ser. No. 376,715, filed June 22, 1964, now abandoned.

This invention relates to a new host material for lasers and a method for using and a method for making the same. More particularly, it relates to hot pressed polycrystalline host material for lasers. It also relates to the doping, purifying and hot pressing of polycrystalline material of sufficiently high optical quality that it can be used in lasers.

The ions of a laser which produce the lasing effect are known in the laser art as doping ions. A large part of the effort in developing a laser is involved in the successful integration of the doping ions into a suitable host.

A similar amount of effort must be devoted to production of a host with proper qualities. A suitable host must have an extremely high optical quality and for most applications a high thermal conductivity as well as the ability to properly accept the doping ion.

Thus far, the majority of solid state laser hosts are of the inorganic single crystal variety. In comparison to most vitreous materials, single crystals have a high thermal conductivity and in the case of numerous compounds can be produced with a high optical quality. However, maintenance of uniform doping conditions during crystal growing is always difficult. In many cases, with even the most careful work, a substantial gradient of doping density develops as the crystal is pulled.

The other known solid inorganic laser material is glass. While uniform doping generally is achievable in glass, glass has a much lower thermal conductivity than most crystals. This makes it far less practical when, as is often the case, the ability to conduct heat away from the laser is important.

Other crystalline forms of matter have not been thought to be of a high enough optical quality to be considered as a laser host. $CaF_2$, a popular laser material when in the single crystal form, can be made into a multiple crystalline form by ordinary melting and cooling. This form has numerous grain boundaries and is generally of poor optical quality. By a process which is the subject of a number of copending applications, a substance such as $CaF_2$ in such a multiple crystalline form is powdered and hot pressed into a homogeneous polycrystalline form which has good optical properties. Although when first developed it did not approach the single crystal in optical quality, for certain uses it was generally agreed to be superior to the single crystal because of increased structural strength.

According to the present invention, a hot pressed polycrystalline laser material of high thermal conductivity is produced in which the integration of the doping ions is far more likely to be uniform than in single crystals and is not dependent upon crystal pulling techniques. In addition, the polycrystalline material is generally structurally stronger than the single crystal of the same compound, thereby better adapted to optical finishing.

The optical quality of this material developed for use as a laser is much improved over prior hot pressed polycrystalline optical materials of the same compound, and in fact approaches or equals the single crystal in this respect. Without such improved quality an efficient laser would not be possible. Obviously, the material is particularly well suited for other precision optical uses such as highest quality lenses, prisms, etc.

Because the optical properties in the polycrystalline materials developed in accordance with this invention are in many respects similar to those of the single crystal, the distinguishing features require precise definition. Without the use of optical instruments, the only obvious difference is the increased structural strength of the polycrystalline material. This increased structural strength is due to the reduction of the effect of planes of cleavage which cause weakness in single crystals. These planes of cleavage do not weaken the hot pressed polycrystalline form of material because, compared to the single crystal, the crystal grains are too small and not uniformly oriented with each other. That is, while each individual grain has a crystal lattice within it, the grains themselves are randomly oriented in respect to each other. Any planes of cleavage then are no bigger than individual grains. This is believed to be the reason why the material is much stronger and more receptive to optical finishing. This is further evidenced by the fact that increasing the fineness of the starting particles will increase the structural strength.

It is well known that so-called "single crystals" are generally not "single" in the strict sense of the word since at least a few low angle grain boundaries generally develop in the formation of the crystal. On the other hand, in the process of hot pressing certain grain growth and alignment of crystals may under certain conditions take place. Nevertheless, any substantial thickness, say one centimeter, of the polycrystalline material will have an apparent random orientation when compared to a single crystal of the same size.

Demonstration of the structure of hot pressed polycrystalline material including this lack of overall uniform orientation is best made by X-ray diffraction techniques. As is well known, a single crystal placed at a particular angle of orientation to an X-ray beam will by optical interference either reflect the radiation striking it or not, depending upon whether the crystal is placed with its lattice oriented at a characteristic angle for that wavelength and that particular type of crystal. However, when a polycrystalline substance is placed in the X-ray beam, all reflections characteristic of the material are seen at one time without rotation (or reorientation) of the material. This indicates that there are grains of the material oriented in all possible directions. The few low angle grain boundaries which develop in single crystal pulling, do not have this effect of creating characteristic planes running in all directions.

Further evidence of the polycrystalline nature of the material produced according to the invention is shown in photomicrographs, preferably electron micrographs of cross sections of the material which show a large number of grain boundaries randomly coalesced. The number of grain boundaries per linear millimeter in high quality polycrystalline material can vary from less than ten to more than 5,000, but in any significant thickness, say one centimeter, the grains must be considered randomly oriented.

Thus, the term "single crystal" as used herein includes objects which are in fact single crystals and also crystalline objects in which a few grain boundaries have developed in crystal pulling. The term "polycrystalline" refers to crystalline material in which for a sample one centimeter thick the plane orientation as evidenced by X-ray diffraction is random.

Applicants' process as applied to the making of lasers, may be divided into three general steps:

(1) Uniformly integrating the doping ion with the host compound.
(2) Powdering and purifying the doped host.
(3) Hot pressing the purified powder produced by (2).

The invention will be further understood by reference to the following detailed description and the accompanying drawings, in which.

Figure 1:
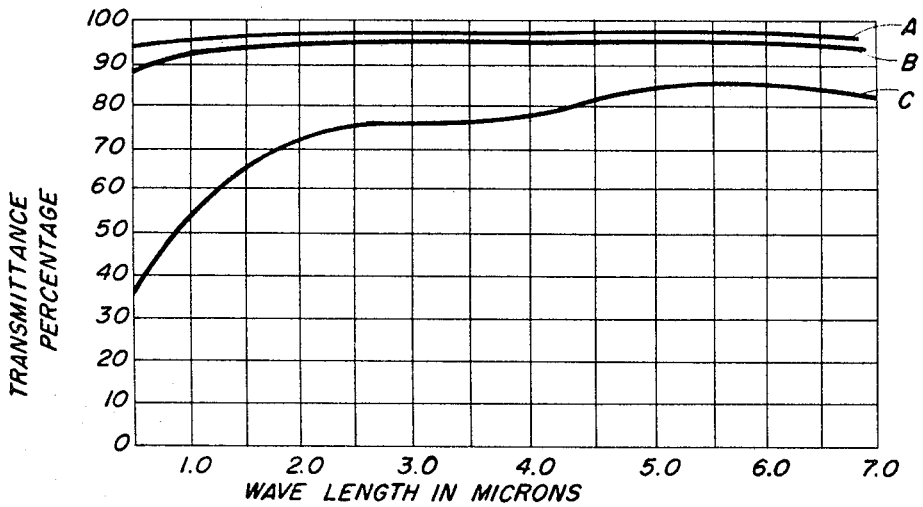
FIG. 1 is a graph showing the transmittance of electromagnetic radiation according to wavelength of hot pressed $CaF_2$, made according to the invention as compared to single crystal $CaF_2$ and prior art hot pressed $CaF_2$.

The drawings will be more completely discussed in the specific examples.

Integration of the doping ion

Applicants have found integration of the doping ion in the host to be best accomplished by melt-mixing (1) the host compound and (2) a compound of the doping ion and the anion of the host. As is presently done with single crystals, two or more types of doping ion can be integrated into the same hot pressed host by methods similar to that used when just one type is integrated.

Prior to melting, the compound of the doping ion can be purified by baking in a drying gas such as hydrogen fluoride. This not only dries the mixture but tends to eliminate any oxides present. For best results this bake is operated at between 400° C. and 600° C. for at least one hour.

The mixture is then melted and the temperature raised sufficiently above the melting point to cause considerable thermal agitation thereby uniformly mixing the ion in the host. The melting may be done in a vacuum, inert or reducing atmosphere. The reducing atmosphere is preferable in certain cases since many ions (for example, $Sm^{2+}$, $Dy^{2+}$ and $U^{3+}$) must be finally put in a subnormal valence state for proper lasing. An alternative method of obtaining a subnormal state is with hard X-rays (.25 m.e.v.), gamma rays of high energy electrons after the polycrystal is formed. The vacuum or inert atmosphere is used in those cases where there is no desire to keep the doping ion in a reduced state.

Upon cooling, a solid of low optical quality in the crystalline form is obtained with the doping ion integrated within its structure. Doping is uniform above the microscopic level, something not easily achieved in single crystal doping.

Powdering and purifying

The crystalline solid is ground into a fine powder. At this point, it is advisable to purify the powder with hydrochloric acid and distilled water in successive steps to remove any impurities introduced in grinding, such as iron.

For best results it should be vacuum dried and then baked in a dry oxygen atmosphere to remove lint. Best results from the oxygen bake are obtained if the powder is slowly heated (from 1 to 6 hours) to a temperature in excess of 250° C., preferably between 400° C. and 600° C. Oxygen is then admitted and the temperature is held there for more than 5 hours, preferably in excess of 12 hours, thereby oxidizing any carbonaceous contaminants in the powder.

For further purification, the powder can be baked in a drying atmosphere such as hydrogen fluoride as described in the doping step.

Hot press step

The powder as doped and purified should then be hot pressed. This step is specifically described for each of a large number of inorganic compounds in a number of copending applications. U.S. Patent 3,131,025, Carnall et al., describing apparatus and processes for hot pressing zinc sulfide into polycrystalline optical elements is referred to for an example of a method of performing this step. Variations for the individual compounds will be mentioned in the examples.

From the hot press step, a laser material of optical quality very close to that of the single crystal of the same compound is formed. As mentioned above, evidence that it is polycrystalline and not single crystal or amorphous appears from the X-ray diffraction and from a large number of grain boundaries appearing in photomicrographs of the material and from the fact that it is easier to optically finish than the single crystal, having none of the large planes of cleavage present in single crystals.

Although the above is a description of the general process for making doped polycrystalline laser materials, it will be seen from the examples below that changes in the temperature, pressure and method of purification and doping will be necessary for optimum results as different compounds are used in the process.

EXAMPLE 1

In Example 1, a calcium fluoride ($CaF_2$) laser material is made which, when doped with certain ions according to the invention, gives lasing results as good as those produced by the single crystal with no greater threshold pumping required. The laser material is of such high optical quality that its uses in lenses, prisms and other optical devices is also of considerable practical importance quite aside from the use in a laser.

The actual hot pressing step is essentially the same as that disclosed in the above mentioned U.S. Patent 3,131,025, Carnall et al. The high optical quality and lasing ability (the latter partially dependent upon high optical quality) are obtained by following steps in addition to those disclosed in the Carnall et al. patent.

A dry fluoride of the doping ion is subjected to a high temperature anhydrous hydrogen fluoride bake thereby converting any oxide present to a fluoride and successfully drying the material. The fluoride is mixed with calcium fluoride and melted, preferably at about 1500° C. At this temperature thermal agitation uniformly distributes the doping ion throughout the mixture. This may be done either in a vacuum, inert or a reducing atmosphere depending on the desired valence state of the ion as previously described. The doped melt is allowed to cool, solidifying into a low optical quality crystalline form.

The crystalline form is then fractured, preferably by grinding into a coarse powder. It is then treated in hydrochloric acid to remove any ion contamination from the powdering and washed in distilled water to remove the hydrochloric acid and any soluble iron chlorides present.

The powder can then be vacuum dried at approximately 25° C. to remove the water. It is then slowly heated under vacuum to between 400° C. to 600° C. over a period of 1–6 hours. Dry oxygen is then introduced and the tempertaure is held therefor at least 5 hours and preferably more than 12 hours, thereby oxidizing any lint or other carbonaceous contaminants in the powder.

For further purification the powder may again be baked in dry hydrogen fluoride as described above removing any oxides and water still present.

The powder is then hot pressed as described in the above-mentioned U.S. patent. For $CaF_2$ the preferred temperatures are between 800° C. and 1,000° C. at pressures from 20,000 to 60,000 pounds per square inch for periods of from 15 to 60 minutes. Graphite spacers above and below the charge are important to the best results in this step.

Studies on the thus produced polycrystalline $CaF_2$ laser material detect no migration of doping ions into grain boundaries, as might be expected. Since the hot pressing operation is carried out well below the melting point of the material, the doping concentration in the starting powder is maintained throughout the finished piece and is thus much more likely to be uniform than in single crystals. Hence, the invention produces a new type of laser material by a more reliable method than those known heretofore.

For production of a laser, hot pressed $CaF_2$ can be doped with all of the ions which will work with single crystal $CaF_2$ including $Ce^{3+}$, $Pr^{3+}$, $Pm^{3+}$, $Sm^{2+}$, $Eu^{2+}$, $Gd^{3+}$, $Ho^{2+}$, $Tm^{2+}$, $Tb^{3+}$, $Dy^{2+}$, $Ho^{3+}$, $Yb^{3+}$, $U^{3+}$ and and $Nd^{3+}$, but the best results are gained with those that fluoresce strongly at longer wavelengths, namely, $Dy^{2+}$, $U^{3+}$, $Tm^{2+}$, $Nd^{3+}$, $Ho^{3+}$ and $Yb^{3+}$. The best of these are $Dy^{2+}$, $U^{3+}$ and $Ho^{3+}$. As is presently done with single crystals, more than one type of doping ion may be successfully integrated into a single hot pressed host.

A closed adherence to the purification steps in this process produces polycrystalline $CaF_2$ of higher optical quality than prior hot pressing processes. The purification steps, therefore, are quite useful even though the final product is not used as a laser.

Figure 2:
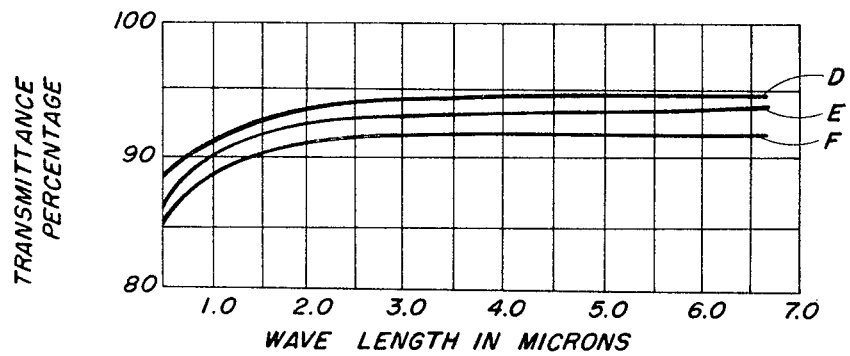
FIG. 2 is a similar graph comparing the transmittance of $CaF_2$, $SrF_2$ and $BaF_2$ made according to the invention.

As illustrative of the higher quality produced, reference is made to FIG. 1 and FIG. 2. In FIG. 1 the percent of transmission through $CaF_2$ of thickness .35 inch, of electromagnetic radiation is plotted against the wavelength of such radiation. Curve A represents $CaF_2$ in the single crystal form; Curve C represents hot pressed polycrystalline $CaF_2$ made by the best methods prior to the use of the above steps of purification and Curve B represents hot pressed polycrystalline $CaF_2$ with a close adherence to the purification steps of this invention. Reflection losses at two surfaces of more than 5% have not been taken into consideration, hence the actual transmission of nonreflected radiation is very nearly 100% at 2 to 7 microns and more than 96% at 1 micron. The results of the improvements in optical quality are most noticeable at shorter wavelengths, for example, hot pressed $CaF_2$ of .35 inch thickness made by processes prior to this invention transmits less than 60% of nonreflected radiation of 1 micron wavelength.

FIG. 2 compares the transmittance percentage of $CaF_2$, $SrF_2$ and $BaF_2$ made according to the invention in Curves D, E and F, respectively, for samples .200 inch thick. Reflection losses again are not taken into consideration. At one micron such reflection losses approximate 5% of $CaF_2$, 6% for $SrF_2$ and 7% for $BaF_2$. Thus, for nonreflected radiation the curves are comparable.

Similarly, tests on an interferometer of $CaF_2$ made according to the invention have disclosed a refractive gradient of less than .001% where refractive gradient is defined as the maximum difference in index of refraction in any two parts of a single pressing of the material.

EXAMPLE 2

In Example 2, strontium fluoride ($SrF_2$) is prepared with the same purification and doping steps as $CaF_2$ and the hot pressing is done with the equipment shown in the Carnall et al. reference. Hot pressing is best accomplished under approximately the same conditions of temperature, pressing and time as $CaF_2$.

Although all of the doping ions used with $CaF_2$ can be used with $SrF_2$, the best results are obtained with $Nd^{3+}$, $Dy^{2+}$, $U^{3+}$, $Tm^{2+}$ and $Ho^{3+}$.

As shown in FIG. 2, the transmittance of $SrF_2$ so prepared is essentially as good as $CaF_2$ and $BaF_2$. Similarly, the refractive gradient is less than .001%.

EXAMPLE 3

In Example 3, barium fluoride ($BaF_2$) is prepared with essentially the same doping and purification steps as $CaF_2$ and $SrF_2$, and the hot pressing is done in the same equipment shown in the Carnall et al. reference. The doping step can be accomplished at a slightly lower temperature, about 1400° C., because of a lower melting point. The hot pressing is done at between 700° C. and 900° C. at pressure from 20,000 to 60,000 pounds per square inch for periods from 15 to 60 minutes. As with $CaF_2$ and $SrF_2$, graphite spacers enclosing the charge while hot pressing are important to best results.

Although all of the doping ions mentioned for $CaF_2$ and $SrF_2$ can be used with $BaF_2$, the best results are obtained with $Dy^{2+}$, $U^{3+}$, $Nd^{3+}$, $Ho^{3+}$ and $Tm^{2+}$.

As mentioned above, the optical quality of $BaF_2$ using the processes of this invention is essentially as good as $CaF_2$. It again is very much better than prior art hot pressed $BaF_2$ optical pieces. As shown in FIG. 2, a sample .20 inch thick has a transmission of greater than 95% the nonreflected electromagnetic radiation of one micron wavelength. Similarly, like $CaF_2$, it has a refractive gradient of less than .001%.

The invention has been described in considerable detail with particular reference to certain preferred embodiments thereof, but it will be understood that variations and modifications can be effected within the spirit and scope of the invention as described hereinbefore and as defined in the appended claims.

We claim:

1. An article of manufacture comprising a laser having a host compound and doping ions uniformly integrated therein, said host compound being a polycrystalline form of an inorganic compound selected from the group consisting of calcium fluoride, strontium fluoride and barium fluoride and the doping ions being selected from the group consisting of $Sm^{2+}$, $Dy^{2+}$, $Ho^{3+}$, $U^{3+}$, $Yb^{3+}$, $Nd^{3+}$, $Tm^{2+}$ and $Tm^{3+}$.

2. A doped laser material according to claim 1 wherein the host compound is calcium fluoride.

3. A doped laser material according to claim 1 wherein the host compound is strontium fluoride.

4. A doped laser material according to claim 1 wherein the host compound is calcium fluoride and the doping ions are $Dy^{2+}$.

5. A doped laser material according to claim 1 wherein the host compound is strontium fluoride and the doping ions are $Dy^{2+}$.

6. A method of forming a high optical quality laser material having a polycrystalline host compound selected from the group consisting of $CaF_2$, $SrF_2$, and $BaF_2$ with doping ions uniformly integrated therein comprising the following steps:

(A) baking a doping compound of a doping ion fluoride in a dry hydrogen fluoride atmosphere at a temperature of between 400° C. and 600° C., (B) mixing the dry doping compound into a molten form of the host compound in the absence of an oxidizing atmosphere, (C) allowing the mixture thus formed to cool into a crystalline solid, (D) powdering such solid into a power, (E) washing the powder in hydrogen chloride, (F) washing the powder in water, (G) slowly heating the powder in a dry oxygen atmosphere to a temperature between 400° C. and 600° C. and maintaining said powder at a temperature between 400° C. and 600° C. for at least 12 hours.

(H) baking the powder in a dry hydrogen fluoride atmosphere at a temperature between 400° C. and 600° C., (I) hot pressing the powder into a unitary polycrystalline laster material of more than 99% theoretical density.

(References on following page)

References Cited

UNITED STATES PATENTS

| | | | |
|---|---|---|---|
| 3,131,025 | 4/1964 | Carnall et al. | 23—135 |
| 3,208,009 | 9/1965 | Etzel et al. | 252—301.4 X |
| 3,219,585 | 11/1965 | Kaiser | 252—301.1 |

OTHER REFERENCES

Henderson: Metallurgical Dictionary, Reinhold Pub. Corp., New York, 1953, pp. 246 and 291.

Sorokin et al.: IBM Journal of Research and Development, vol. 5, January 1961, pp. 56 to 58.

Laine: Nature (London), vol. 191, Aug. 19, 1961, pp. 795 to 796.

Wood et al.: Physical Review, vol. 126, No. 6, June 15, 1962, pp. 2079 to 2088.

Porto et al.: Proceedings of the IRE, vol. 50, No. 6, June 1962, pp. 1542 to 1544.

LELAND A. SEBASTIAN, *Primary Examiner.*

U.S. Cl. X.R.

23—88; 264—5, 82; 252—3014; 331—945